United States Patent
Kooten

[11] Patent Number: 5,403,046
[45] Date of Patent: Apr. 4, 1995

[54] ELASTOMERIC HOUSE COUPLING

[76] Inventor: Dwayne V. Kooten, 8990 E. Jewell Cir., Denver, Colo. 80231

[21] Appl. No.: 241,760

[22] Filed: May 12, 1994

[51] Int. Cl.⁶ ............................................. F16L 35/00
[52] U.S. Cl. ................................... 285/319; 285/921
[58] Field of Search ............................ 285/319, 921

[56] References Cited

U.S. PATENT DOCUMENTS

| | | | |
|---|---|---|---|
| 883,941 | 4/1908 | Eagan | 285/319 X |
| 988,423 | 4/1911 | Wittekopf . | |
| 1,307,273 | 6/1919 | Salley . | |
| 1,851,992 | 2/1930 | Smith . | |
| 2,246,436 | 2/1941 | Downey . | |
| 2,516,743 | 3/1947 | Allin . | |
| 2,672,924 | 4/1952 | Anthes . | |
| 3,032,358 | 3/1960 | Rolston . | |
| 3,667,785 | 5/1970 | Kapeker . | |
| 3,740,061 | 6/1973 | Jensen . | |
| 4,281,856 | 8/1981 | Litman . | |
| 4,434,811 | 3/1984 | Murdoch . | |
| 4,659,116 | 4/1987 | Cameron . | |
| 4,905,766 | 3/1990 | Dietz . | |
| 5,029,904 | 7/1991 | Hunt | 285/319 X |
| 5,039,133 | 8/1991 | Albrecht | 285/921 X |
| 5,046,763 | 9/1991 | Martucci et al. | 285/319 X |

OTHER PUBLICATIONS

Imperial Brass Manufacturing Co. Bulletin 3061-B, 1956.

Primary Examiner—Randolph A. Reese
Assistant Examiner—Heather Chun Shackelford
Attorney, Agent, or Firm—Frank P. Grassler

[57] ABSTRACT

A coupling device especially adapted for the joining of polyethylene underground irrigation hoses, having a female portion, a male portion and a lock cap, the female portion having a threaded nipple for insertion into a hose end and several tabbed prongs that snap into holes in the locking cap, the male portion likewise having a threaded nipple for insertion into a second hose end and several lugs that fit into grooves in the lock cap, enabling the male portion to be pulled out of the assembly for a limited distance, for ease of fitting into difficult hose coupling situations. The presence of the lugs prevents rotation of the male portion with respect to the cap until the male portion is pulled out of the assembly far enough that the lugs are pulled past the end of the locking cap.

5 Claims, 2 Drawing Sheets

ELASTOMERIC HOUSE COUPLING

BACKGROUND OF THE INVENTION

This invention relates to devices of the class used for joining fluid carrying conduits. More specifically, the invention is a coupler used to connect irrigation tubing or hoses, meaning either the connecting of two lengths of tubing or hose to each other, or the connecting of one tube or hose to a threaded plumbing fixture.

Underground lawn sprinkling systems and other underground irrigation systems generally are comprised of varying lengths of polyethylene hose or tube. Although polyvinyl chloride (PVC) tube is a widely used material for interior plumbing systems, PVC is not suitable for such underground systems in all climates, as PVC is rigid and cannot accomodate changes in dimension caused by freeze-thaw cycles. The PVC pipe system must be drained of all water every cold season by draining or blowing, in order to prevent rupture by the expansion of frozen water. Polyethylene can, however, accomodate such temperature changes, so it has become the predominant material in such underground systems. Polyethylene poses a problem for installers and repairers, though. After underground installation, whenever it is necessary to join two lengths of polyethylene tube or hose, a coupling must be used, of the type that has two nipples to fit into each end of the hoses to be joined. To install the coupling, the installer very frequently has to lift and gently bend one end of hose, in order to shorten that length of hose enough to fit over the end of a nipple and then be pushed over the length of the nipple. Even if due care is exercised in the installation, while so bending the hose it often kinks, which substantially weakens the integrity of polyethylene hose. This in turn necessitates expensive and time consuming hose replacement and further repair.

Therefore, there is a need for a coupler that can be installed in such polyethylene irrigation systems without the need to bend up one of the hose sections to be joined and run the risk of kinking the section. It is the primary object of the present invention to meet this need by providing a coupling that can be dimensionally shortened to fit into a gap between two sections of hose to be joined, and then be dimensionally lengthened so that each nipple can be thrust into each of the hose ends. The present invention accomplishes this by the use of a three component assembly, namely an outer or female nippled component, an inner or male nippled component and a locking cap. The inner component can slide with respect to the outer component, thus shortening or lengthening the complete coupling. Thus, the assembled coupling can be placed in a cut gap between two lengths of hose, one nipple can be inserted into the first end of hose and the coupling can be pulled out or expanded so that the second nipple can be inserted into the second hose end. By being able to expand in length, the coupling does away with the need to lift and bend one end of hose, eliminating that as a source of potential hose kinks.

Another object of the invention is to be able to securely affix a lock cap without the need for adhesives. This has been accomplished by the inclusion of several spring biased tabbed prongs on the outer periphery of the outer or female member, that snap into holes in the lock cap when the lock cap is telescopically fitted over the female member. This feature eliminates the need for adhesives, which are toxic, expensive and messy to handle.

SUMMARY OF THE INVENTION

The invention is a coupler for joining elastomeric hoses, comprising firstly an outer tubular coupling member having a longitudinal axis and distal and proximal ends; having a nipple at the distal end for sealably seating within a predetermined length of a first elastomeric hose to be joined; and a plurality of spring biased lock tabs arrayed circumferentially at the proximal end; with at least a portion of the internal diameter of the outer tubular coupling member being of a suitable dimension to telescopically receive an inner tubular coupling member; comprising secondly an inner tubular coupling member having a longitudinal axis and distal and proximal ends; having a nipple at the distal end for sealably seating within a second elastomeric hose to be joined to said first elastomeric hose; at least one annular groove at the proximal end for receiving a ring shaped distortable sealing member; and a plurality of projections on the outer surface of said inner tubular coupling member, the projections circumferentially arrayed on said inner tubular coupling member; the proximal end of said inner tubular coupling member fitting telescopically inside of the proximal end of said outer tubular coupling member; and comprising thirdly a substantially tubular locking cap member having a longitudinal axis and distal and proximal ends; having an internal diameter of a suitable dimension to telescopically fit over said inner and outer tubular coupling members; having a plurality of recesses positioned to receive said spring biased lock tabs when said locking cap is telescopically fitted over said inner and outer tubular coupling members, thereby locking said cap onto said outer tubular coupling member; said locking cap additionally having a plurality of substantially longitudinal grooves in the locking cap's inner surface of sufficient dimension to slideably receive said plurality of projections on said inner tubular coupling member to prevent rotational movement of the inner tubular coupling member with respect to the cap, yet allowing such rotational movement when, after assembly of the cap, the inner tubular coupling member and the outer tubular coupling member, at least a portion of the inner tubular coupling member is pulled along a substantially longitudinal axis for a sufficient distance such that said projections are pulled past the end of said cap, thereby allowing such rotational movement.

A more preferred embodiment of the invention, that can either be used to join one elastomeric hose to another or to join an elastomeric hose to a plumbing fixture comprises firstly an outer tubular coupling member having a longitudinal axis and distal and proximal ends; having a nipple at the distal end for sealably seating within a predetermined length of a first elastomeric hose to be joined, said nipple beating on its outer surface a plurality of saw-toothed parallel threads; a flange against which an end portion of said elastomeric hose abuts; a plurality of spring biased lock tabs arrayed circumferentially at the proximal end; with at least a portion of the internal diameter of the outer tubular coupling member being of a suitable dimension to telescopically receive an inner tubular coupling member; and an internal surface flange against which said inner tubular coupling member abuts; secondly an inner tubular coupling member having a longitudinal axis and distal and proximal ends; having a nipple at the distal end for sealably seating within a predetermined length of a second elastomeric hose to be joined to the first elastomeric hose, said nipple bearing on its outer surface a plurality of saw-toothed parallel threads, or for sealably seating within a threaded fluid-carrying fixture, in which case said nipple bears on its outer surface a plurality of helical threads; at least one annular circumferential groove at the proximal end for receiving a ring shaped distortable sealing member; and a plurality of lugs on the outer surface of said inner tubular coupling member, the lugs circumferentially arrayed on said inner tubular coupling member; the proximal end of said inner tubular coupling member fitting telescopically inside of the proximal end of said outer tubular coupling member; and thirdly a substantially tubular locking cap member having a longitudinal axis and distal and proximal ends; having an internal diameter of a suitable dimension to telescopically fit over said inner and outer tubular coupling members; having a plurality of recesses positioned to receive said spring biased lock tabs when said locking cap is telescopically fitted over said inner and outer tubular coupling members, thereby locking said cap onto said outer tubular coupling member; said locking cap additionally having a plurality of substantially longitudinal grooves in the locking cap's inner surface of sufficient dimension to slideably receive said plurality of lugs on said inner tubular coupling member to prevent rotational movement of the inner tubular coupling member with respect to the cap, yet allowing such rotational movement when, after assembly of the cap, the inner tubular coupling member and the outer tubular coupling member, at least a portion of the inner tubular coupling member is pulled along a substantially longitudinal axis for a sufficient distance such that said projections are pulled past the end of said cap, thereby allowing such rotational movement.

DETAILED DESCRIPTION OF THE PREFERRED EMBODIMENTS

Figure 1:
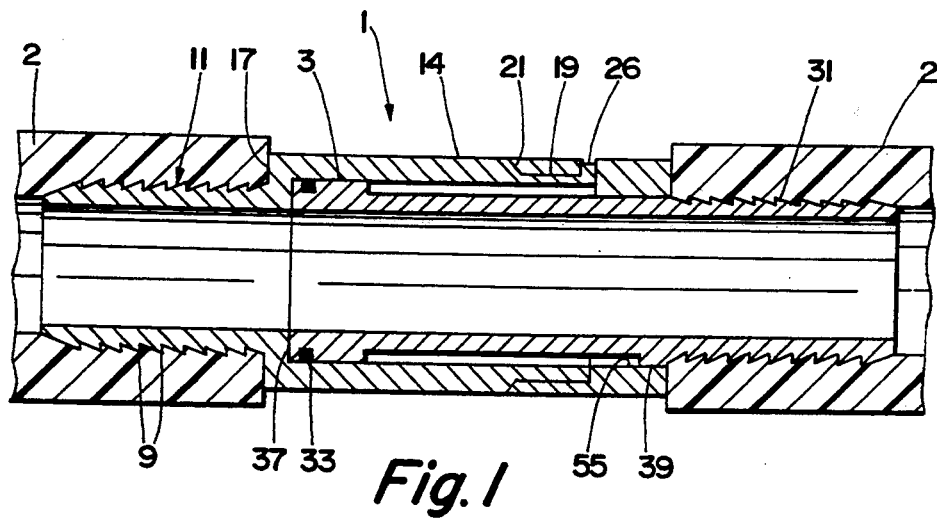
FIG. 1 is a longitudinal central cross section view of two lengths of hose connected by a preferred embodiment of the invention.

At FIG. 1 there is shown in cross section the assembled coupler of the present invention, with hoses or tubes 2 shown fitted over the nipples 11 and 31. It can be seen that the entire coupling assembly is made up of three components: the outer tubular coupling member 3, which can be seen to be a female type coupling member; the inner tubular coupling member 5, which can be seen to be a male type coupling member; and the locking cap member 7.

Figure 2:
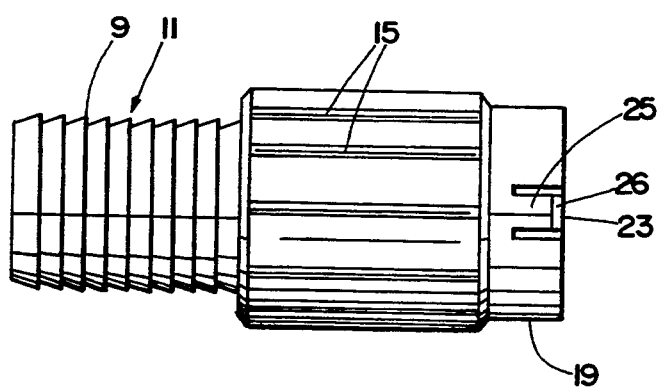
FIG. 2 is a longitudinal cross section in partial cutaway view, showing the outer tubular coupling member, featuring the pronged locking tabs.
Figure 3:
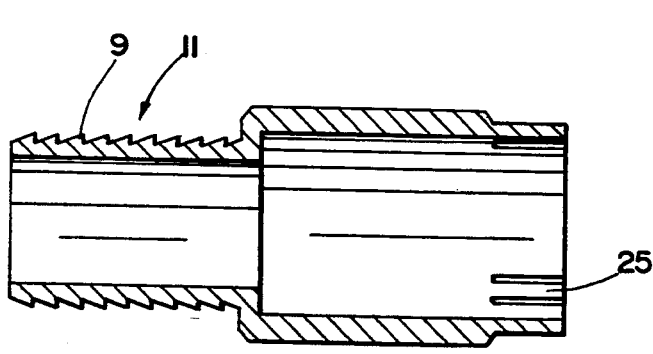
FIG. 3 is a longitudinal cross section view showing the outer tubular coupling member.
Figure 4:
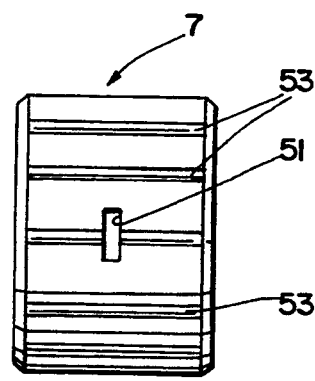
FIG. 4 is a longitudinal side view of the locking cap.
Figure 5:
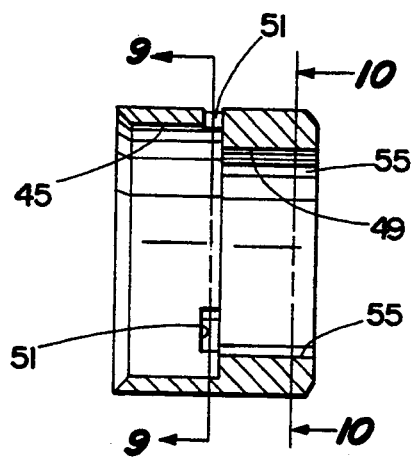
FIG. 5 is a longitudinal cross section view showing the locking cap.

The outer tubular coupling 3 is shown in FIGS. 2 and 3, where it can be seen to be a substantially tubular component. The nipple 11 preferably bears a plurality of circumferential parallel threads 9 that tend to grip into the relatively soft material of an elastomeric hose. Most preferably, the threads 9 are a sawtooth pattern in profile, that permits ready fitting of the end of a hose over the nipple up to the hose abutment flange 17, but resists pulling the same hose end off of the nipple 11. The outside diameter of the nipple 11 is a slight degree larger than the inside diameter of the hose to be connected, and outside diameters of the nipple 11 are molded in sizes that comport to industry standards for hoses. In a more preferred embodiment of the invention, the outer barrel 14 of the outer tubular coupling 3 has molded or otherwise fixably mounted thereon a plurality of ribs 15 that run substantially in a longitudinal axis parallel to the longitudinal axis of the coupling assembly. The ribs 15 are an aid to the installer or repairer to get a better grip on the outer tubular coupling 3, which, since it is preferably molded plastic, will be slippery if wet. In an alternative embodiment of the invention the outer barrel 14 has molded thereon a plurality of nubs or other raised surface shapes, or has molded thereon a roughened surface to increase friction.

The outer tubular coupling's outside diameter tapers down to a smaller cap-engaging diameter 19, over which the cap 7 telescopically fits up to the limit of a cap abutment flange 21. Although a physical taper is shown in FIG. 1, the flange 21 is not necessarily tapered and can be perpendicular to the longitudinal axis of the outer coupling.

The outer tubular coupling 3 has a plurality of spring biased lock tabs 23 arrayed circumferentially about its distal end as shown in FIGS. 1, 2, and 3. Preferably, there are three such lock tabs uniformly arrayed. In the most preferred embodiment, each lock tab is itself comprised of a prong portion 25 and a tab portion 26. The most efficient way of forming the prongs is to design a mold that has a pair of slots cut into it that run substantially parallel and for a distance sufficiently calculated to enable the prong to be moved during assembly, with due consideration given to the elastic modulus of the particular material chosen for the coupling. Thus, for example, for a polyethylene outer tubular coupling of 1¼" inside diameter, slots formed to a depth of approximately 5/16" will form a prong that can be sprung inwards when the cap 7 is fitted over the distal end of the outer coupling.

Figure 7:
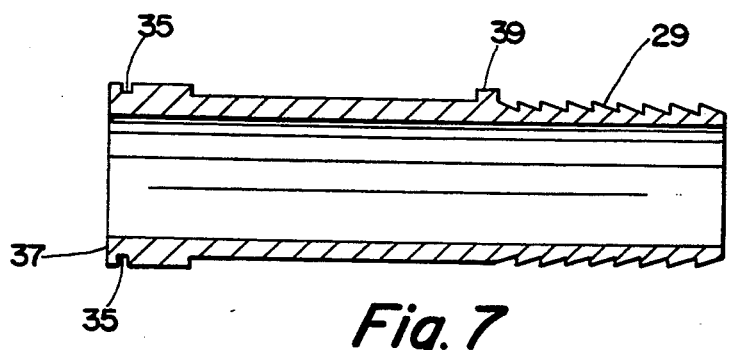
FIG. 7 is a longitudinal cross section view showing the inner coupling member.

The inner tubular coupling 5 is shown in FIGS. 1 and 7, where it can be seen to be a substantially tubular component. Its nipple 31, like the nipple 11 on the outer coupling 3, preferably bears on its distal end a plurality of circumferential threads 9 that most preferably are a sawtooth pattern in profile. In an important alternative embodiment of the invention, the threads 9 on the distal end of the inner tubular coupling member 5 can be helical instead of parallel, so that the coupling can be screwed into a plumbing fixture having a suitably threaded bore.

The inner coupling has, at its proximal end, at least one annular groove 35 (FIG. 7) for receiving a ring shaped distortable sealing member, which most preferably is an O-ring 33 (FIG. 1) made of a suitable rubber or plastic compound. Depending on the application in question, more than one annular groove and O-ring can be fabricated on the inner coupling. The inner tubular coupling member 5 can be pushed into the outer tubular coupling member 3 until the abutment flange 37 is reached.

Figure 8:
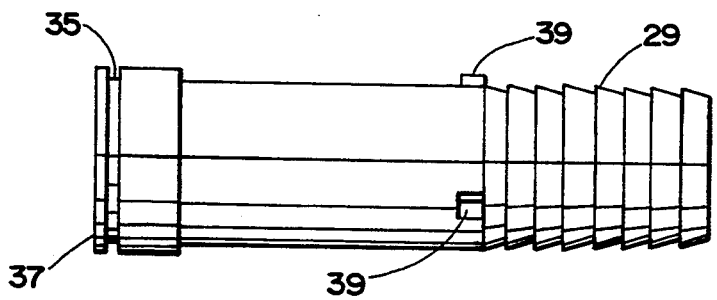
FIG. 8 is a side view showing the inner coupling member and featuring external lugs on the surface.
Figure 9:
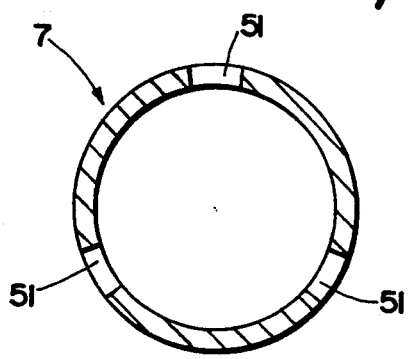
FIG. 9 is a cross section view of the locking cap, taken through the thinner diameter of the cap, showing the sockets for receiving the prong tabs of the invention.
Figure 10:
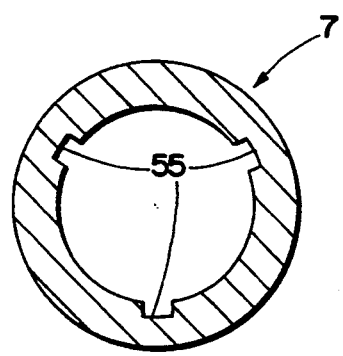
FIG. 10 is a cross section view of the locking cap, taken through the thicker diameter of the cap, showing the grooves for receiving the external lugs of the inner coupling member.

The inner tubular coupling member 5 has a plurality of projections 39 circumferentially arrayed on its outer surface, as shown in FIG. 8. These are preferably molded lugs. Most preferably, there are three lugs that are substantially cuboidal in shape and are uniformly arrayed. The lugs will most advantageously be formed relatively close to the threads 29.

The cap member 7 is shown in FIGS. 1, 4, 5 and 6. The cap is substantially tubular, and in a preferred embodiment has several ribs 53 that run substantially in a longitudinal axis parallel to the longitudinal axis of the coupling assembly. As is the case for the ribs 15 on the outer tubular coupling member 3, the ribs 53 on the cap 7 are an aid in gripping the coupling during installation. Alternative means for aiding gripping likewise include a plurality of nubs or other raised surface shapes, or to have molded thereon a roughened surface to increase friction.

The cap 7 has at least two inside diameters; a larger diameter 45 that accomodates the distal end of the outer tubular coupling member 3, and a smaller diameter 49 that accomodates the distal end of the inner tubular coupling member 5. There are several openings in the cap that form sockets 51 so dimensioned as to receive the pronged tabs 26 on the outer coupling member 3 when the cap 7 is pushed onto the outer coupling member 3.

Figure 6:
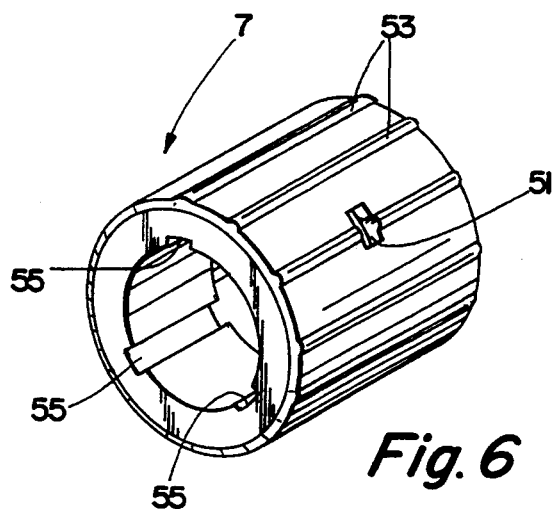
FIG. 6 is a perspective view of the locking cap, taken along line 5-5, featuring the slots in the cap for receiving the lugs on the inner coupling member.

The cap 7 additionally has a sufficient number of grooves 55 formed in the material defined by the smaller diameter 49 so as to allow the projections 39 to slideably move through the grooves 55 when the inner coupling member 5 is pulled or pushed through the cap 7. Most preferably, these grooves 55 open to the distal end of the cap 7, as shown in FIG. 6, but not to the proximal end.

In preferred method of operation, the cap member 7 is telescopically pushed part way onto the inner coupling member 5 so that the grooves 55 open towards the threads 9. The grooves slide over the projections 39. The nipple 31 is fitted in a section of hose or tube to be joined, or in the embodiment having helical threads, is screwed into a plumbing fixture threaded bore. Then, the outer coupling member 3 is telescopically fitted onto the proximal end of the inner coupling member 5 and the cap 7 is pushed onto the proximal end of the outer member 3 until the pronged tabs 26 snap into the cap sockets 51, locking the cap in place. The assembled coupler I is then lengthened by pulling the outer member 3 away from inner member 5 as nipple 9 is inserted into the second end of hose or tube to be joined. It should be noted that while the projections 39 are engaged in the grooves 55, the cap cannot rotate with respect to the inner member 5. Whenever the inner member 5 is pulled past the end of cap 7, the projections 39 do not engage the grooves 55 and the cap 7 can rotate with respect to the inner member 5.

Although by virtue of the spring biased tabbed prongs on the outer or female coupling the locking cap can be permanently affixed without the need for adhesives, such adhesives can still be used. The adhesive of choice for the PVC type of coupling is methyl ethyl ketone. There is an alternative embodiment of the invention that does not feature the spring biased tabbed prongs, and it would be entirely appropriate to use adhesive to lock the cap in place. Or, adhesive could be used in the pronged version for extra locking protection. In yet another embodiment of the invention, an annular groove is caused to be formed between the female member abutment flange 47 and the cap abutment flange 21 providing a suitable channel for liquid adhesive to be injected into, allowing the adhesive to run into the contact area between the interior of the cap 7 and the exterior of the female member 3.

The coupling components can most economically be made by injection molding techniques well known to those of ordinary skill in the plastics art. The most preferred material for molding the coupling components is PVC. Although PVC is unsuitable for use as underground conduit for water due to the aforementioned problems with it being unable to accomodate temperature changes, the relatively short length of the coupling in relation to the overall length of the conduit system of which it is a part means that shrinkage and expansion due to temperature changes will be adequately accomodated by the polyethylene hoses, minimizing stress on the coupling.

While the invention has been described and illustrated with reference to certain preparative embodiments thereof, those skilled in the art will appreciate that various changes, modifications and substitutions can be made therein without departing from the spirit and scope of the invention. It is intended, therefore, that the invention be limited only by the scope of the claims which follow, and that such claims be interpreted as broadly as possible.

What is claimed is:

1. A coupler for joining elastomeric hoses, comprising:
    (a) an outer tubular coupling member having a longitudinal axis and distal and proximal ends; having a nipple at the distal end for sealably seating within a predetermined length of a first elastomeric hose to be joined; and a plurality of spring biased lock tabs arrayed circumferentially at the proximal end; with at least a portion of the internal diameter of the outer tubular coupling member being of a suitable dimension to telescopically receive an inner tubular coupling member;
    (b) an inner tubular coupling member having a longitudinal axis and distal and proximal ends; having a nipple at the distal end for sealably seating within a second elastomeric hose to be joined to said first elastomeric hose; at least one annular groove at the proximal end for receiving a ring shaped distortable sealing member; and a plurality of projections on the outer surface of said inner tubular coupling member, the projections circumferentially arrayed on said inner tubular coupling member; the proximal end of said inner tubular coupling member fitting telescopically inside of the proximal end of said outer tubular coupling member; and (c) a substantially tubular locking cap member having a longitudinal axis and distal and proximal ends; having an internal diameter of a suitable dimension to telescopically fit over said inner and outer tubular coupling members; having a plurality of recesses positioned to receive said spring biased lock tabs when said locking cap is telescopically fitted over said inner and outer tubular coupling members, thereby locking said cap onto said outer tubular coupling member; said locking cap additionally having a plurality of substantially longitudinal grooves in the locking cap's inner surface of sufficient dimension to slideably receive said plurality of projections on said inner tubular coupling member to prevent rotational movement of the inner tubular coupling member with respect to the cap, yet allowing such rotational movement when, after assembly of the cap, the inner tubular coupling member and the outer tubular coupling member, at least a portion of the inner tubular coupling member is pulled along a substantially longitudinal axis for a sufficient distance such that said projections are pulled past the end of said cap, thereby allowing such rotational movement.

2. A coupler for joining elastomeric hoses, comprising:
(a) an outer tubular coupling member having a longitudinal axis and distal and proximal ends; having a plurality of substantially circumferential threads at the distal end for sealably seating within a predetermined length of a first elastomeric hose to be joined; a flange against which an end portion of said elastomeric hose abuts; and a plurality of spring biased lock tabs arrayed circumferentially at the proximal end; with at least a portion of the internal diameter of the outer tubular coupling member being of a suitable dimension to telescopically receive an inner tubular coupling member;
(b) an inner tubular coupling member having a longitudinal axis and distal and proximal ends; having a plurality of substantially circumferential threads at the distal end for sealably seating within a predetermined length of a second elastomeric hose to be joined to the first elastomeric hose to be joined, or for sealably seating within a threaded fluid-carrying fixture; at least one annular groove at the proximal end for receiving a ring shaped distortable sealing member; and a plurality of projections on the outer surface of said inner tubular coupling member, the projections circumferentially arrayed on said inner tubular coupling member; the proximal end of said inner tubular coupling member fitting telescopically inside of the proximal end of said outer tubular coupling member; and
(c) a substantially tubular locking cap member having a longitudinal axis and distal and proximal ends; having an internal diameter of a suitable dimension to telescopically fit over said inner and outer tubular coupling members; having a plurality of recesses positioned to receive said spring biased lock tabs when said locking cap is telescopically fitted over said inner and outer tubular coupling members, thereby locking said cap onto said outer tubular coupling member; said locking cap additionally having a plurality of substantially longitudinal grooves in the locking cap's inner surface of sufficient dimension to slideably receive said plurality of projections on said inner tubular coupling member to prevent rotational movement of the inner tubular coupling member with respect to the cap, yet allowing such rotational movement when, after assembly of the cap, the inner tubular coupling member and the outer tubular coupling member, at least a portion of the inner tubular coupling member is pulled along a substantially longitudinal axis for a sufficient distance such that said projections are pulled past the end of said cap, thereby allowing such rotational movement.

3. The coupler as claimed in claim 2, wherein said ring shaped distortable sealing member is a robber O-ring.

4. The coupler as claimed in claim 2, wherein said plurality of spring biased lock tabs are each further comprised of a pair of substantially parallel grooves through the wall of said outer tubular coupling member, said grooves defining a prong, the prong having at its end a perpendicular projection that is substantially co-planar with the distal end of said outer tubular coupling member.

5. A coupler for joining elastomeric hoses or for joining an elastomeric hose to a threaded plumbing fixture, comprising:
(a) an outer tubular coupling member having a longitudinal axis and distal and proximal ends; having a nipple at the distal end for sealably seating within a predetermined length of a first elastomeric hose to be joined, said nipple bearing on its outer surface a plurality of saw-toothed parallel threads; a flange against which an end portion of said elastomeric hose abuts; a plurality of spring biased lock tabs arrayed circumferentially at the proximal end; with at least a portion of the internal diameter of the outer tubular coupling member being of a suitable dimension to telescopically receive an inner tubular coupling member; and an internal surface flange against which said inner tubular coupling member abuts;
(b) an inner tubular coupling member having a longitudinal axis and distal and proximal ends; having a nipple at the distal end for sealably seating within a predetermined length of a second elastomeric hose to be joined to the first elastomeric hose, said nipple bearing on its outer surface a plurality of saw-toothed parallel threads, or for sealably seating within a threaded fluid-carrying fixture, in which case said nipple bears on its outer surface a plurality of helical threads; at least one annular circumferential groove at the proximal end for receiving a ring shaped distortable sealing member; and a plurality of lugs on the outer surface of said inner tubular coupling member, the lugs circumferentially arrayed on said inner tubular coupling member; the proximal end of said inner tubular coupling member fitting telescopically inside of the proximal end of said outer tubular coupling member; and
(c) a substantially tubular locking cap member having a longitudinal axis and distal and proximal ends; having an internal diameter of a suitable dimension to telescopically fit over said inner and outer tubular coupling members; having a plurality of recesses positioned to receive said spring biased lock tabs when said locking cap is telescopically fitted over said inner and outer tubular coupling members, thereby locking said cap onto said outer tubular coupling member; said locking cap additionally having a plurality of substantially longitudinal grooves in the locking cap's inner surface of sufficient dimension to slideably receive said plurality of lugs on said inner tubular coupling member to prevent rotational movement of the inner tubular coupling member with respect to the cap, yet allowing such rotational movement when, after assembly of the cap, the inner tubular coupling member and the outer tubular coupling member, at least a portion of the inner tubular coupling member is pulled along a substantially longitudinal axis for a sufficient distance such that said projections are pulled past the end of said cap, thereby allowing such rotational movement.

* * * * *

UNITED STATES PATENT AND TRADEMARK OFFICE
CERTIFICATE OF CORRECTION

PATENT NO. : 5,403,046
DATED : April 4, 1995
INVENTOR(S) : Kooten

It is certified that error appears in the above-identified patent and that said Letters Patent is hereby corrected as shown below:

On the title page, item [76] Inventor: "Dwayne V. Kooten" should read --Dwayne VanKooten--

Item [54], Col. 1, line 1, "Elastomeric House Coupling" should read --Elastomeric Hose Coupling--.

Signed and Sealed this

Fifteenth Day of September, 1998

Attest:

BRUCE LEHMAN

Attesting Officer

Commissioner of Patents and Trademarks